UNITED STATES PATENT OFFICE.

JALMAR G. NATHURST, OF KINGSTON, NEW YORK.

EXPLOSIVE.

1,005,739.  Specification of Letters Patent.  Patented Oct. 10, 1911.

No Drawing.  Application filed September 6, 1910.  Serial No. 580,686.

*To all whom it may concern:*

Be it known that I, JALMAR G. NATHURST, a citizen of the United States, residing at Kingston, in the county of Ulster and State of New York, have invented certain new and useful Improvements in Explosives; and I do hereby declare the following to be a full, clear, and exact description of the invention, such as will enable others skilled in the art to which it appertains to make and use the same.

This invention relates to explosives, and has for its object the production of a gelatin explosive that will be normally plastic and practically non-freezing, as well as one which will not give off noxious fumes on detonation, and very little smoke.

To these ends the invention consists in the novel composition of matter and process of producing the same; more fully hereinafter disclosed and particularly pointed out in the claims.

I have discovered that by adding starch nitrate or dextrin nitrate to the nitrocellulose in the manufacture of nitrogelatin, the freezing point of the latter may be depressed to a degree sufficient to make the same substantially non-freezing, and if I add a suitable dope the resulting gelatin explosives will also be practically non-freezing.

I preferably employ a dextrin or starch nitrate containing about 12.75 per cent. nitrogen, which may be prepared as follows:—One part of achroo-dextrin, known in commerce as yellow dextrin, is dissolved in four parts of nitric acid of a strength of about 73 per cent. $HNO_3$, and at a temperature below 16° centigrade. The clear liquid thus obtained is slowly run into fifteen parts of sulfuric acid, $H_2SO_4$, under constant stirring, and care is taken to prevent the temperature from rising above 32° centigrade. The mixture is allowed to stand for about an hour, when it is run into cold water, washed repeatedly, and finally given a wash in a weak aqueous solution of ammonia containing about 3 per cent. $NH_3$. It is then dried at a temperature of about 60° centigrade.

In order to prepare my non-freezing gelatin explosive, I take six parts nitrated dextrin prepared as above, and mix it with five parts of nitro-cellulose containing substantially 12.25 per cent. nitrogen and itself prepared at a low temperature, so as to have a low viscosity. This mixture is next gelatinized to a normally plastic mass in about 70 parts nitroglycerin at a temperature of 50° centigrade. 18 parts of ammonium nitrate and one part of a suitable antacid such as magnesite, is next incorporated in the said mixture.

Of course, the above proportions may be varied without departing from the spirit of my invention, and other oxidizing agents such as sodium or potassium nitrates may be used instead of the ammonium nitrate, but when so used, it is desirable to add an equivalent amount of sulfur in order to increase the disruptive effects of the explosion.

Nitrated starches or nitrated dextrins are highly soluble in nitroglycerin and, therefore, they are especially adapted to my purpose.

A nitro-cellulose with about 12.25 per cent. of nitrogen makes a good jelly with nitro-glycerin, but if its content of nitrogen be greatly lowered, it will form a very thin jelly. On the other hand, if the content of nitrogen of the nitro-cellulose is very high, it does not gelatinize at all in nitroglycerin. Further, a nitro-dextrin with about 12.75 per cent. nitrogen is more suitable for my purpose than a nitro-dextrin of a low nitrogen content, because it is more easily soluble in nitro-glycerin.

Of course, the explosive thus produced can be manufactured into 40 per cent., 50 per cent., 60 per cent., 75 per cent., or 100 per cent. strengths as desired, and upon trial they are found to be substantially non-freezing; to give off no noxious gases upon detonation, and to give off very little smoke.

What I claim is:—

1. The herein described non-freezing normally plastic explosive containing a nitrated dextrin; nitrocellulose; nitroglycerin; and a solid inorganic oxydizing agent, substantially as specified.

2. The herein described non-freezing, plastic explosive containing a nitrated dextrin having substantially 12.75 per cent. nitrogen; nitrocellulose having substantially 12.25 per cent. nitrogen; nitroglycerin; and a solid inorganic oxidizing agent, substantially as specified.

3. The herein described non-freezing, plastic explosive, containing six parts of a nitrated dextrin having 12.75 per cent. nitrogen to one hundred parts of the explosive, substantially as specified.

In testimony whereof, I affix my signature, in presence of two witnesses.

JALMAR G. NATHURST.

Witnesses:
CHAS. E. WALLER,
CHAS. D. SAAL.